J. HUMPHREYS.
SPOKE AND FELLY CLIP.
APPLICATION FILED JUNE 29, 1909.

956,806.

Patented May 3, 1910.

Witnesses
Jas. F. McCathran
George Tate

John Humphreys, Inventor
By E. G. Siggers
Attorney

UNITED STATES PATENT OFFICE.

JOHN HUMPHREYS, OF HENDERSON, KENTUCKY.

SPOKE AND FELLY CLIP.

956,806. Specification of Letters Patent. Patented May 3, 1910.

Application filed June 29, 1909. Serial No. 505,043.

*To all whom it may concern:*

Be it known that I, JOHN HUMPHREYS, citizen of the United States, residing at Henderson, in the county of Henderson and State of Kentucky, have invented a new and useful Spoke and Felly Clip, of which the following is a specification.

This invention relates to an improved spoke and felly clip.

In the wheels of the present construction, the spoke-tenons invariably become loosened through different causes, and consequently rattle, thereby causing much annoyance; they also, very often become broken, thereby necessitating a new spoke.

This invention is principally intended for use in assembling new wheels in which spoke-tenons are not employed; also it can be used in repairing wheels of the present construction which embody spoke-tenons.

The principal object of the invention is to provide a device for detachably securing a spoke to the felly.

Another object of the invention is to provide a clamping means for the purpose of repairing split fellies.

A still further object of the invention is to provide a device of the class described which is simple in construction, cheap to manufacture, and easy of application.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
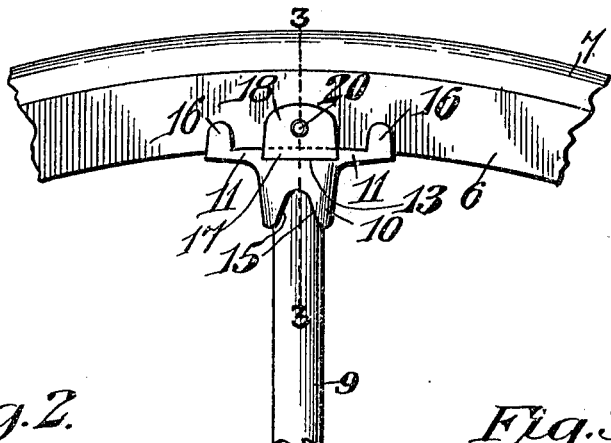
Figure 2:
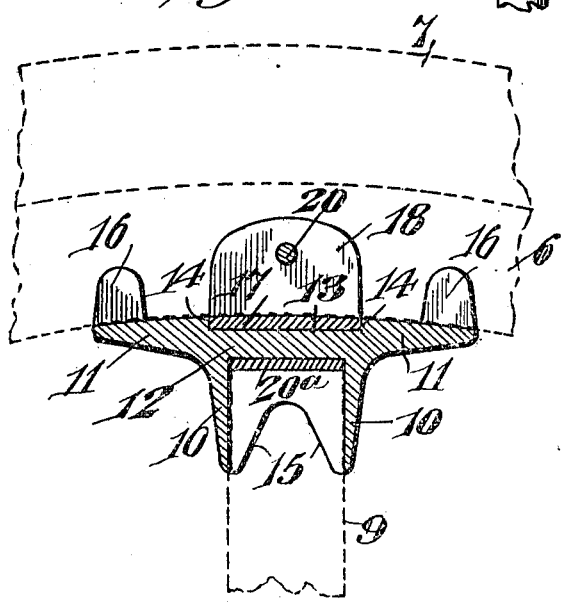
Figure 3:
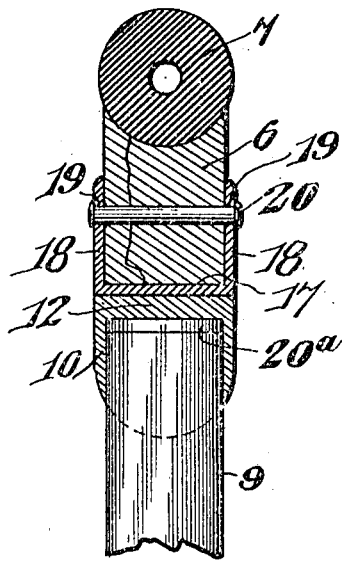
Figure 4:
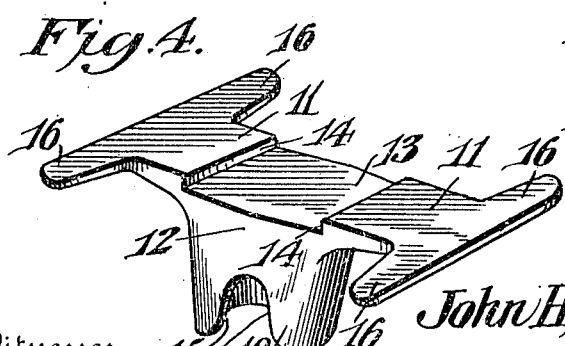
Figure 5:
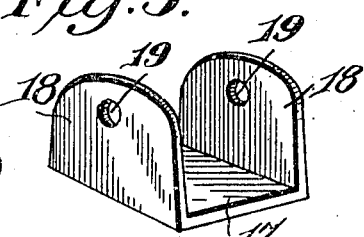

In the drawing:—Figure 1 is a side elevation showing the invention in position. Fig. 2 is a longitudinal sectional view through the device and showing the spoke and felly in dotted lines. Fig. 3 is a vertical sectional view taken on the line 3—3 of Fig. 1. Fig. 4 is a perspective view of the spoke socket, and Fig. 5 is a perspective view of the felly clip.

Like reference numerals designate corresponding parts in all the figures of the drawing.

Referring to the drawing, 6 designates the felly of a wheel having any suitable tire 7 mounted thereon, the end of the spoke 9 being spaced from the felly for a purpose hereinafter described.

The invention consists of a spoke-engaging member which comprises a spoke-receiving socket 10, having felly-engaging lips or jaws 11, arranged to extend from opposite sides thereof. The base-portion or body 12 of the member is thickened, as shown in Fig. 2, to provide for a recess 13 which is formed in the felly-engaging surface thereof. This recess or cut-out portion provides transverse shoulders or abutments 14 employed for a purpose hereinafter described. The spoke-receiving socket 10 is preferably cut-out as shown at 15, although this is not necessary. The upper or felly-engaging surfaces of the lips or jaws 11—11, are preferably formed flat to conform to the shape of the felly. The lips 11 are respectively provided at their ends with oppositely and transversely extending ears 16.

The invention further comprises a substantially U-shaped felly-engaging member or clip, which is formed from a flat piece of metal and comprises a base-portion 17 bent at its ends to form upstanding ears 18, said ears being spaced a distance apart equal to the width of the felly, each of said ears being respectively provided with an opening 19. The felly-engaging member or clip is first secured to the felly in a manner as clearly shown by reference to Fig. 3 of the drawing, the same being retained in position by means of a rivet or bolt or other suitable common fastening means 20, which extends through the felly and the openings 19 of the member. Thus, if a felly becomes split or broken, this clip could be successfully employed to bind the split or broken parts together, as shown by reference to Fig. 3 of the drawing. The spoke-engaging member is placed on the end of the spoke in such a manner that the lips or jaws 11—11 will be arranged to engage the underside of the felly. The base-portion 17 of the felly-engaging member will necessarily fit within the recess 13 of the spoke-engaging member, and thus the two members will be interlocked, and the base-portion 17 engages the abutments 14 of the spoke-engaging member, thereby preventing longitudinal movement of the spoke. The oppositely arranged ears 16 are then bent upwardly to engage the opposite sides of the felly, as shown in Figs. 1 and 2, and thereby prevent any lateral movement of the said spoke.

Should a spoke-tenon become damaged, the end of the spoke can be sawed off sufficiently to allow the insertion of the spoke-engaging member. Should the spoke, however, be too short, a washer 20ª preferably of metal, can be inserted in the socket and thereby form a solid connection between the spoke and the felly.

What I claim is:—

1. A device of the class described comprising a spoke-engaging member having felly-engaging means for preventing the lateral movement of the spoke with respect to the felly, and a felly-engaging member comprising a base-portion having its ends respectively bent to form upstanding ears adapted to engage on either side of the felly and to be secured thereto by a common fastening means, said last named member being interlocked with the first named member to prevent the longitudinal movement of the spoke along the felly.

2. A device of the class described comprising a member having a spoke-receiving socket and felly-engaging means, said means comprising oppositely extending lips, ears extending oppositely and transversely from each lip and adapted to engage the opposite sides of the felly and thereby prevent lateral movement of the spoke with respect to the felly, said member being provided between the said lips with a cut-out portion, and a felly-engaging member adapted to be fitted in the said cut-out portion and thereby prevent longitudinal movement of the said spoke along the felly.

3. A device of the class described comprising a member having a spoke-receiving socket and felly-engaging means, said means comprising lips extending from the member at opposite sides of the socket, ears extending oppositely and transversely from each lip and adapted to engage the opposite sides of the felly and thereby prevent lateral movement of the spoke with respect to the felly, said member also having a cut-out portion located between the lips and above the spoke socket, and a felly-engaging member comprising a base-portion having its ends respectively bent to form upstanding ears adapted to respectively engage either side of the felly and to be secured thereto by a common fastening means, the said base-portion adapted to be fitted within the recess of the spoke-engaging member and thereby prevent longitudinal movement of the said spoke along the felly.

In testimony, that I claim the foregoing as my own, I have hereto affixed my signature in the presence of two witnesses.

JOHN HUMPHREYS.

Witnesses:
L. L. McAvoy,
L. Harvey Davis.